US011142154B2

(12) United States Patent
Palazzolo et al.

(10) Patent No.: US 11,142,154 B2
(45) Date of Patent: Oct. 12, 2021

(54) SELF-DIAGNOSING PEDESTRIAN PROTECTION SENSOR SYSTEM FOR A VEHICLE

(71) Applicant: Continental Automotive Systems, Inc., Auburn Hills, MI (US)

(72) Inventors: Christopher James Palazzolo, Ypsilanti, MI (US); Tobias Tyroller, Regensburg (DE); Nicholas J Anger, Lake Orion, MI (US); Michael Feser, Barbing (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 257 days.

(21) Appl. No.: 16/527,157

(22) Filed: Jul. 31, 2019

(65) Prior Publication Data

US 2021/0031715 A1 Feb. 4, 2021

(51) Int. Cl.
| | |
|---|---|
| *B60R 21/0134* | (2006.01) |
| *G05D 1/00* | (2006.01) |
| *B60R 16/023* | (2006.01) |
| *B60R 19/18* | (2006.01) |
| *B60R 21/38* | (2011.01) |
| *B60R 21/36* | (2011.01) |
| *G01L 1/04* | (2006.01) |
| *G01L 5/00* | (2006.01) |
| *G01L 5/04* | (2006.01) |
| *G07C 5/08* | (2006.01) |

(52) U.S. Cl.
CPC ...... *B60R 21/0134* (2013.01); *B60R 16/0232* (2013.01); *B60R 19/18* (2013.01); *B60R 21/36* (2013.01); *B60R 21/38* (2013.01); *G01L 1/042* (2013.01); *G01L 5/0052* (2013.01); *G01L 5/047* (2013.01); *G05D 1/0055* (2013.01); *G05D 1/0088* (2013.01); *G07C 5/08* (2013.01); *B60R 2019/1873* (2013.01); *B60R 2019/1886* (2013.01); *B60R 2021/01345* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 4,328,986 | A * | 5/1982 | Weller | B60R 19/18 293/120 |
| 9,834,164 | B1 * | 12/2017 | Iyer | B60R 21/38 |
| 2003/0060956 | A1 * | 3/2003 | Rao | G01S 11/12 701/45 |
| 2007/0179693 | A1 * | 8/2007 | Dukart | B60R 21/0136 701/45 |
| 2012/0125699 | A1 * | 5/2012 | Guthrie | F16F 3/023 177/225 |

* cited by examiner

*Primary Examiner* — Richard M Camby

(57) ABSTRACT

A self-diagnosing sensor system for a vehicle is provided. The vehicle has a bumper with fascia material. The sensor system includes an elongated, deflectable cable disposed in the bumper generally adjacent to the fascia material. A tensioning and sensing unit is coupled to each end of the cable and fixed to the vehicle. Each unit includes a tension sensor electrically connected with an ECU of the vehicle such that the ECU receives signals from the tension sensors regarding tension in the cable, indicative of 1) whether the bumper has been impacted based on deflection of the cable from a sensing position, or 2) whether damage to the cable or a tensioning and sensing unit has occurred.

19 Claims, 4 Drawing Sheets

SELF-DIAGNOSING PEDESTRIAN PROTECTION SENSOR SYSTEM FOR A VEHICLE

FIELD

The invention relates to detecting failures in a pedestrian protection sensor system of a vehicle and, more particularly, to a vehicle self-diagnosing protection sensor system to automatically detect in-field failures of the system.

BACKGROUND

One of the main sensing principles employed for pedestrian protection systems is based on pressure. A conventional vehicle bumper, a silicone tube is integrated between a foam energy absorber and a crash beam. When the vehicle bumper contacts an object, the tube is compressed and pressure sensors at each end of the tube register the pressure change. This conventional implementation does not provide a means to diagnose the sensing tube for any damage prior to its use.

There is a growing demand for more reliable and capable pedestrian protection systems for use in the automotive industry. One of the biggest challenges imposed on sensor system designers is to be able to self-diagnose a failure of that system in the field. Being able to diagnose a failure in the system not only ensures the ability to protect pedestrians, but it also allows for the expansion of functionality by integrating the output of the sensor into many other safety related counter measures for a crash response.

Thus, there is a need to provide a vehicle self-diagnosing protection sensor system that automatically detects in-field failures of the system.

SUMMARY

An object of the invention is to fulfill the need referred to above. In accordance with the principles of the present invention, this objective is achieved by providing a self-diagnosing sensor system for a vehicle. The vehicle has a bumper with fascia material. The sensor system includes an elongated, deflectable cable disposed in the bumper generally adjacent to the fascia material. A tensioning and sensing unit is coupled to each end of the cable. Each tensioning and sensing unit is fixed to the vehicle and includes a cable drive member fixed to an end of the cable; a biasing member acting on the cable drive member so as to bias the cable to a non-deflected, sensing position; and a tension sensor constructed and arranged to detect tension of the cable. Each tension sensor is constructed and arranged to be electrically connected with an ECU such that the ECU can receive signals from the tension sensors regarding tension in the cable, indicative of 1) whether the bumper has been impacted based on deflection of the cable from the sensing position, or 2) whether damage to the cable or a tensioning and sensing unit has occurred.

In accordance with another aspect of the invention, a method of diagnosing integrity of a vehicle sensor is provided. The vehicle sensor includes an elongated, deflectable cable disposed in a bumper of the vehicle generally adjacent to fascia material, and a tensioning and sensing unit coupled to each end of the cable and fixed to the vehicle. Each tensioning and sensing unit includes a tension sensor. The method receives, at an ECU of the vehicle, data from the tension sensors while the cable is in a non-deflected, sensing position. The ECU determines if tension of the cable is within a preset range based on the data from the tension sensors. If the tension of the cable is not within the preset range, the ECU disables a crash response function, and activates an indicator to warn a user of failure of the vehicle sensor.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 1:
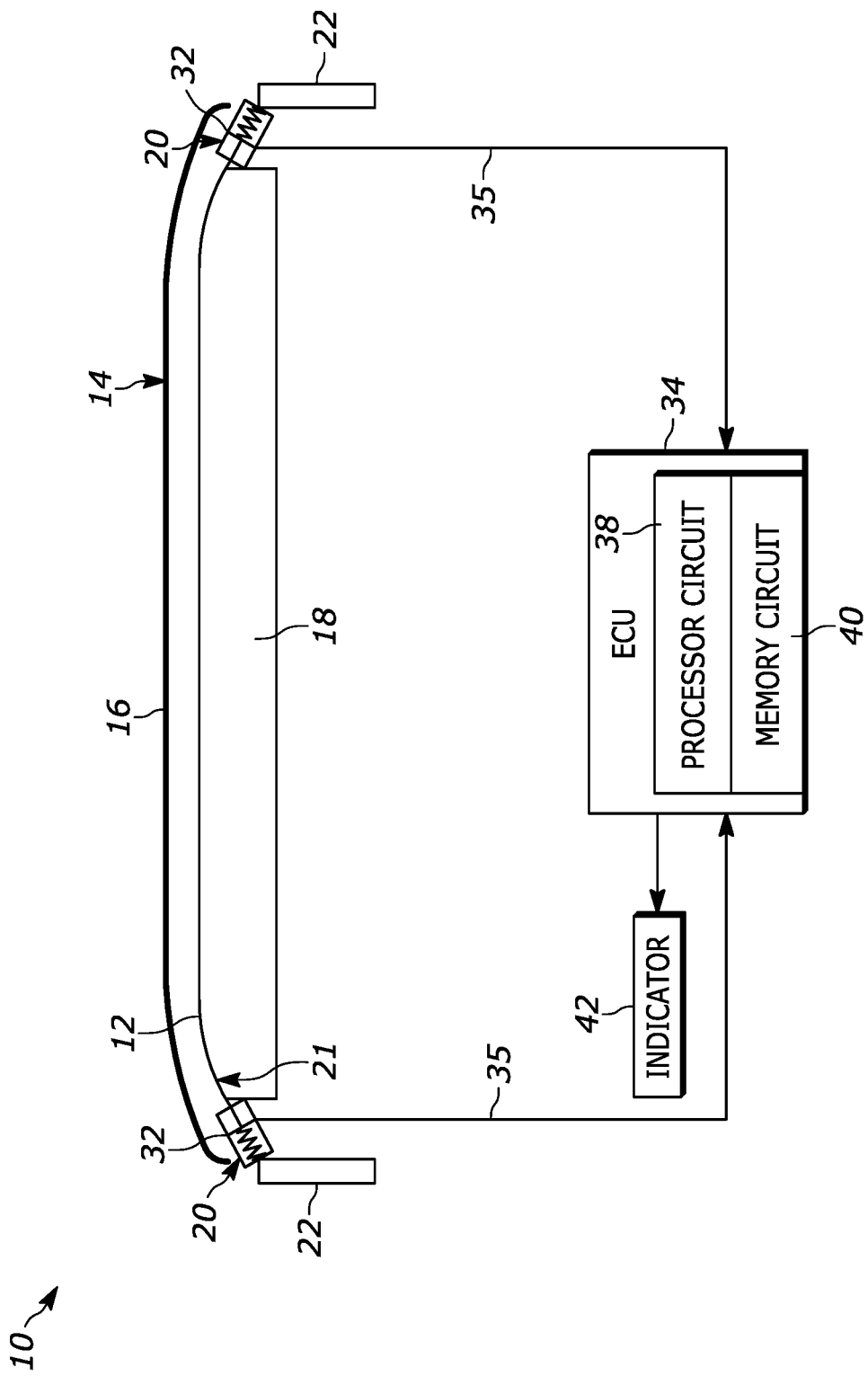
FIG. 1 is schematic view of a self-diagnosing pedestrian protection sensor system for a vehicle, provided in accordance with an embodiment of the invention.

With reference to FIG. 1, a self-diagnosing pedestrian protection sensor system for a vehicle, is shown generally indicated at 10, in accordance with an embodiment. The sensor system 10 includes an elongated, deflectable steel or nylon cable 12 disposed in a vehicle bumper, generally indicated at 14. The cable 12 is preferably disposed behind fascia material 16 and in front of damping foam, plastic or other energy absorbing material 18 of the bumper 14. The damping foam or plastic 18 is provided for pedestrian protection in event of pedestrian contact with the bumper 14. Thus, the cable 12 is advantageously disposed close to the fascia 16 and impact object (e.g., pedestrian) so to allow a sensor (described below) to detect impact soon after a collision occurs. It is noted that the sensor system 10 need not include the energy absorbing material 18 if the front fascia material 16 provides a damping function.

Figure 2:
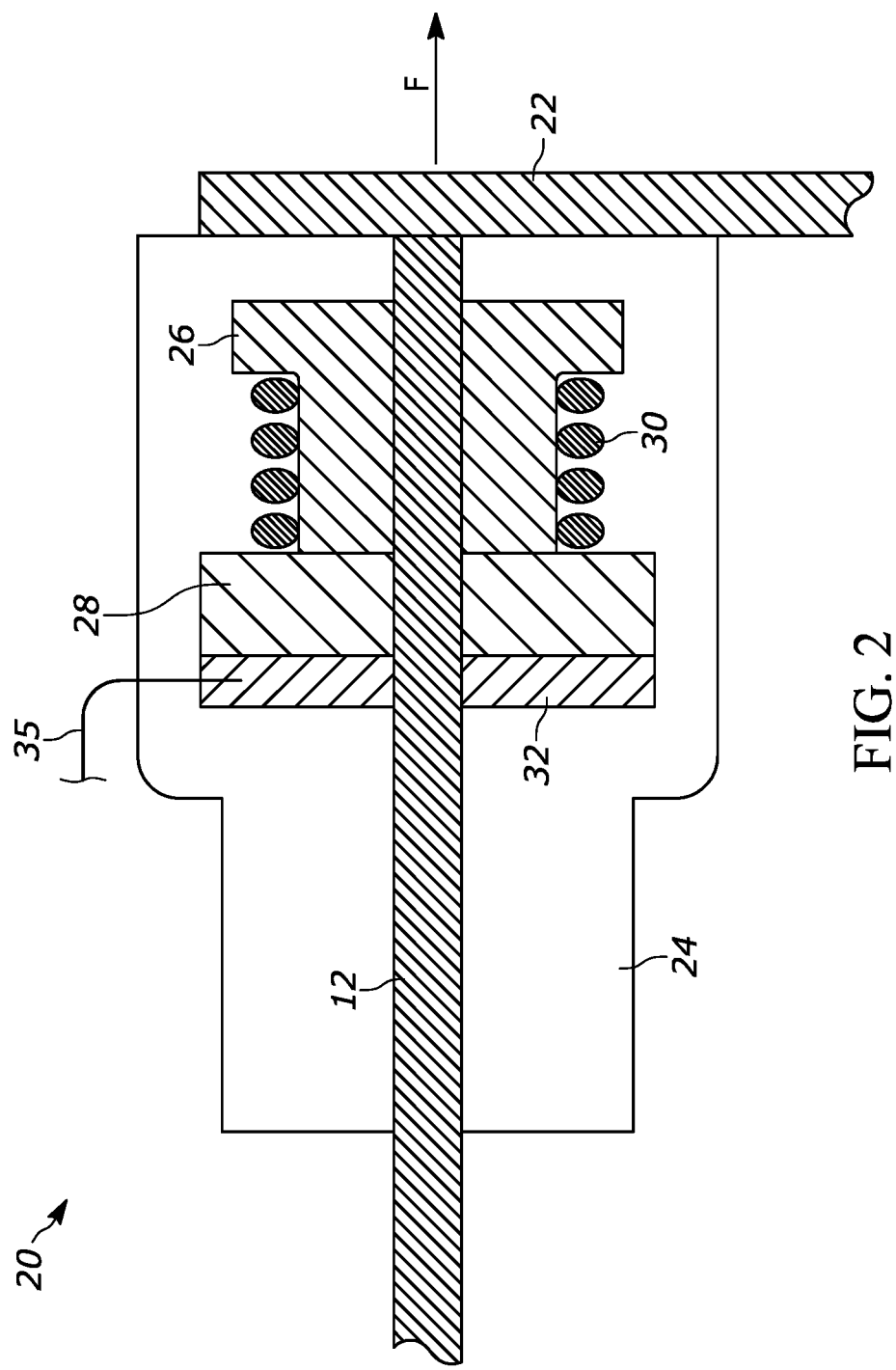
FIG. 2 is an enlarged, partial sectional view of a tensioning and sensing unit of the self-diagnosing sensor system of FIG. 1.

A tensioning and sensing unit, generally indicated at 20, is coupled to each end of the cable 12 and each unit 20 is fixed to the chassis 22 of the vehicle. The cable 12 and units 20 can be considered to be a sensor 21 of the sensor system 10. As best shown in FIG. 2, each unit 20 includes a housing 24 containing a cable drive member or spool 26 fixed to the end of the cable 12 and a drive plate 28 fixed with the spool 26. The drive plate 28 can be considered to be part of the spool 26. A biasing member such as a torsion spring 30 is engaged with the spool 26, biasing the spool 26 and thus the cable 2 in the direction of arrow F in FIG. 2 to return the cable 12 to a sensing position after an impact there-with, as will be explained more fully below. A tension sensor, such as a load cell 32, is fixed to the drive plate 28 and is constructed and arranged to detect a change in tension in the cable 12, indicative of an impact with the bumper 14.

Returning to FIG. 1, each load cell 32 is electrically connected with a vehicle electronic control unit (ECU) 34 via wiring 35.

Figure 3:
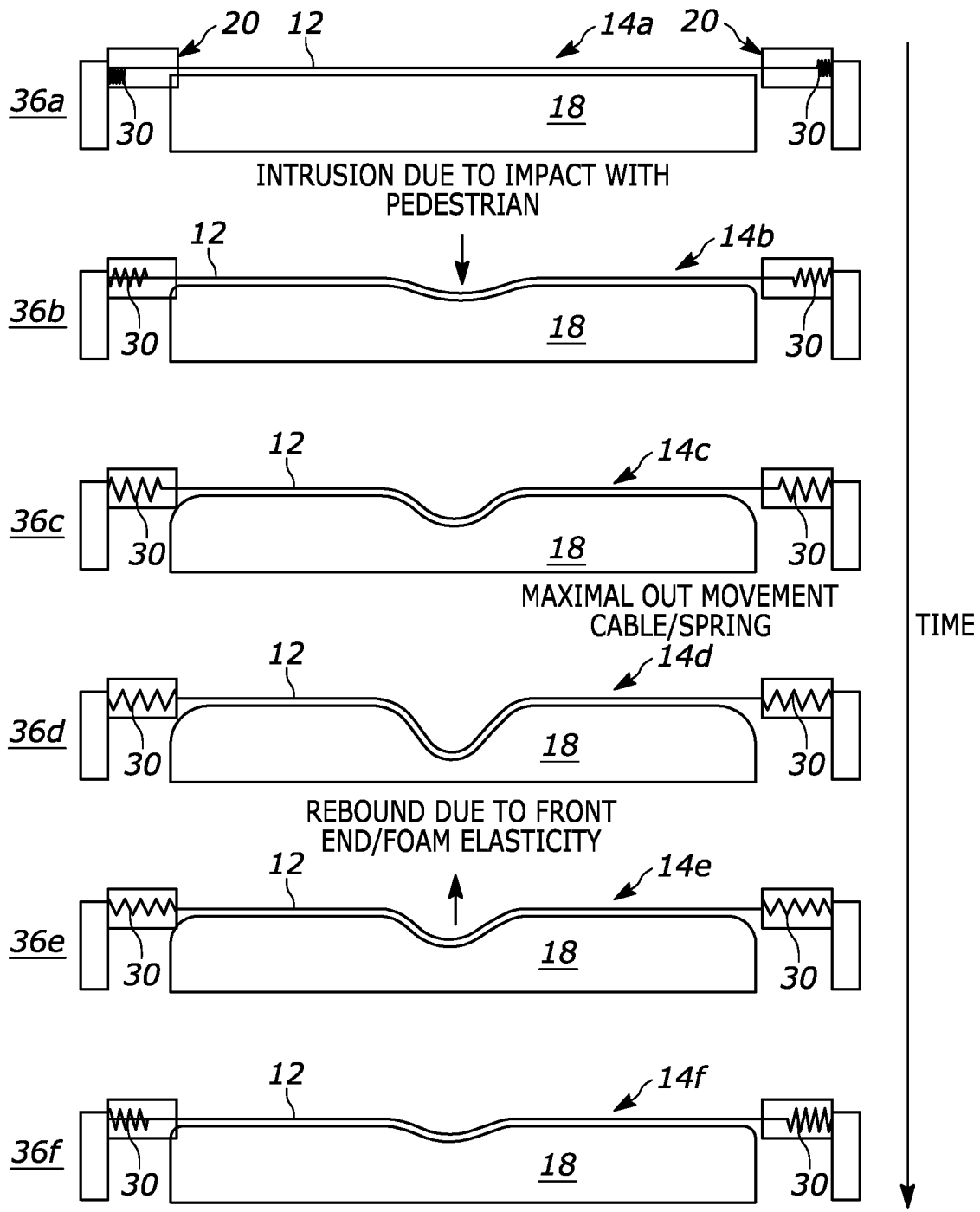
FIG. 3 is schematic illustration of the self-diagnosing sensor system showing how an impact with a pedestrian results in a change in tension of a cable of the system over time.

With reference to FIG. 3, with reference to time, the change in tension in the cable 12 in bumper 14 upon an impact with an object or pedestrian will be appreciated. At event 36a, in bumper 14a, the cable 12 is in a sensing position with the springs 30 being in a compressed state. At event 36b, the bumper 14b has experienced an intrusion or impact due to contact with a pedestrian's leg. Thus, the impact causes the cable 12 to deflect against the damping foam or plastic 18, with the tension in the cable 12 increasing, causing the springs 30 to begin to expand. At event 36c, in the bumper 14c, further tensioning of the cable 12 and further expansion of the springs 30 occur and at event 36d, maximum movement and thus tensioning of the cable 12 and maximum extension of the springs occur in bumper 14d. At event 36e, in bumper 14e, the damping foam or plastic 18, due to its elasticity, begins to cause rebounding of the deflected cable 12 and begins to cause the springs 30 to compress. Finally, at event 36f, in bumper 14f, the damping foam or plastic 18 causes maximum rebounding of the cable 12, with the springs 30 compressing to return the cable 12 generally to its non-deflected, sensing position.

The ECU 34 receives the signals from the load cells 32 regarding the tension in the cable 12. The ECU 34 includes a processor circuit 38 and a memory circuit 40. The ECU 34 can be part of an air bag control unit of the vehicle or can be any other control unit of the vehicle. The data from the load cells 32 can indicate whether a pedestrian has impacted the bumper 14 or whether a more severe front impact has occurred. Also, the data from the load cells 32 can indicate that damage to the sensor 21 has occurred including cable damage or if the units 20 are damaged. Thus, the processor circuit 38 determines whether the measured tension force of the cable 12, in a non-deflected state, is within a preset range as stored in the memory circuit 40. If not, damage to the sensor 21 has been detected and the ECU 34 can signal an indicator 42 in the vehicle to notify the user. The ECU 34 can be part of, or separate from, the system 10.

Figure 4:
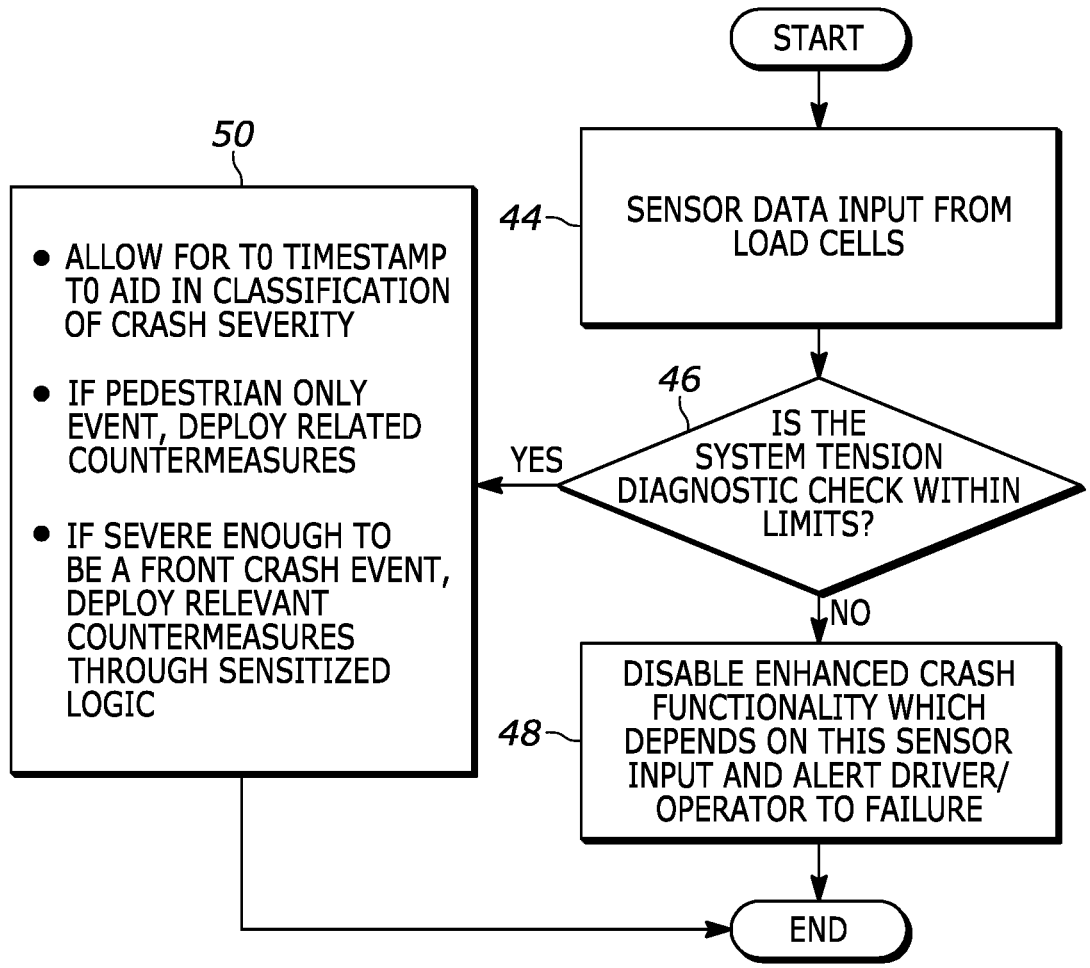
FIG. 4 is a flowchart of a method of an embodiment.

FIG. 4 is a flowchart which highlights the benefit of being able to run a self-diagnostic check on the sensor 21 during a pre-crash phase. In step 44, data from the load cells 32 is received by the processor circuit 38 of the ECU 34. In step 46, the processor circuit 38 determines, based on the load cell data, if the tension of the cable 12 is within a preset range. If not, in step 48, an advanced crash response function (e.g., airbag deployment), which depends on a properly functioning system 10, can be disabled by the ECU 34. In addition, the ECU 34 can activate the indicator 42 to warn the user of the failure of system sensor 21 and take appropriate action as required by the system. In step 50, if the processor circuit 38 determines that the tension of the cable is within the preset range, the ECU 34 after an impact event with the bumper 14 as determined by the load cells 36 measuring the tension of the deflected cable 12 can 1) set a timestamp of T0 (time=0) which aids in classification of crash severity, 2) determine if a pedestrian only crash event occurs and then can deploy related pedestrian countermeasures such as lifting the hood to reduce the risk of severe injury to the pedestrian from hitting the hood and underlying engine block, or 3) determine if there is a severe front crash event and then deploy relevant crash countermeasures such as deploying airbags. Verifying through diagnostics that the sensor 21 is intact pre-crash allows for additional opportunities in calibrating the crash response. For instance, this signal could be used as a contact trigger as an input to the crash algorithm to activate countermeasures. If the vehicle is an autonomous vehicle and the ECU 34 determines that a crash event has occurred, the ECU can send signals to the appropriate controllers to cause the vehicle to immediately stop moving or to move to the side of the road and stop.

A key benefit to this system 10 is that when designed correctly, a pre-load can be imposed on the system 10. This enables the system 10 to detect in-field failures such as a cutting of the cable 12 or a load cell 32 detaching from its mounting system. In the event that an impact occurs with the bumper 14, the deformation of the surrounding fascia 16 results in a change in tension in the cable 12 registered by the attached load cells 32. The dual load cell configuration allows for the system to be able to have a differential reading in order to provide information about the position offset from center of the impact. In addition to this functionality, the system 10 provides less complicated integration and packaging.

By shifting the sensing mode from pressure to a tension measurement in a cable, in-field failures can be detected through the same load cells that send the impact signals.

The operations and algorithms described herein can be implemented as executable code within the ECU 34 having the processor circuit 38 and memory circuit 40 as described, or stored on a standalone computer or machine readable non-transitory tangible storage medium that are completed based on execution of the code by a processor circuit implemented using one or more integrated circuits. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 40 can be implemented, for example, using a non-volatile memory such as a programmable read only memory (PROM) or an EPROM, and/or a volatile memory such as a DRAM, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A self-diagnosing sensor system for a vehicle, the vehicle having a bumper with fascia material, the sensor system comprising:

an elongated, deflectable cable disposed in the bumper generally adjacent to the fascia material,
a tensioning and sensing unit coupled to each end of the cable, each tensioning and sensing unit being fixed to the vehicle and comprising:
a cable drive member fixed to an associated end of the cable,
a biasing member acting on the cable drive member so as to bias the cable to a non-deflected, sensing position, and
a tension sensor constructed and arranged to detect tension of the cable,
wherein each tension sensor is constructed and arranged to be electrically connected with an ECU such that the ECU can receives signals from the tension sensors regarding tension in the cable, indicative of 1) whether the bumper has been impacted based on deflection of the cable from the sensing position, or 2) whether damage to the cable or a tensioning and sensing unit has occurred.

2. The sensor system of claim 1, wherein the system includes the ECU and the ECU includes a processor circuit constructed and arranged to determine whether tension of the cable, when in the sensing position as detected by the tension sensors, is within a preset range.

3. The sensor system of claim 2, further comprising an indicator electrically connected with the ECU, wherein the ECU is constructed and arranged to signal the indicator when the tension of the cable determined to not be within the preset range.

4. The sensor system of claim 1, wherein the biasing members are torsion springs.

5. The sensor system of claim 4, wherein when the cable is in the sensing position, the torsion springs are constructed and arranged to be in a compressed state.

6. The sensor system of claim 5, wherein when the bumper is impacted, the cable is constructed and arranged to deflect such that tension in the cable increases, causing the torsion springs to expand.

7. The sensor system of claim 6, wherein the bumper further includes an energy absorbing material, the cable being disposed in the bumper between the fascia material and the energy absorbing material.

8. The sensor system of claim 7, wherein the energy absorbing material is damping foam or plastic material.

9. The sensor system of claim 7, wherein the energy absorbing material is constructed and arranged to cause the cable to rebound from the deflected position, causing the torsion springs to compress and return the cable to the sensing position.

10. The sensor system of claim 1, wherein the cable is of steel or nylon material.

11. The sensor system of claim 1, wherein each tension sensor is a load cell.

12. A method of diagnosing integrity of a vehicle sensor, the vehicle sensor including an elongated, deflectable cable disposed in a bumper of the vehicle generally adjacent to fascia material thereof, and a tensioning and sensing unit coupled to each end of the cable and fixed to the vehicle, each tensioning and sensing unit comprising a tension sensor, the method comprising the steps of:
receiving, at an ECU of the vehicle, data from the tension sensors while the cable is in a non-deflected, sensing position,
determining, by the ECU, if tension of the cable is within a preset range based on the data from the tension sensors, and
if the tension of the cable is not within the preset range, disabling, by the ECU, a crash response function, and activating, by the ECU, an indicator to warn a user of failure of the vehicle sensor.

13. The method of claim 12, further comprising:
if the tension of the cable is within the preset range and after occurrence of an impact with the bumper as determined by deflection of the cable as sensed by the tension sensors:
determining, via the ECU, 1) if a pedestrian only crash event occurred and deploying pedestrian countermeasures, or 2) if there is a severe front crash event with the vehicle and deploying crash countermeasures.

14. The method of claim 13, wherein the step of deploying pedestrian countermeasures includes lifting a hood of the vehicle to reduce the risk of severe injury to the pedestrian from hitting the hood and underlying engine block.

15. The method of claim 13, wherein the step of deploying crash countermeasures includes activating airbags of the vehicle.

16. The method of claim 13, wherein the vehicle is an autonomous vehicle and wherein the step of deploying crash countermeasures includes controlling the vehicle to stop moving.

17. The method of claim 13, wherein each of the tensioning and sensing units includes a cable drive member fixed to an end of the cable and a torsion spring acting on an associated cable drive member, and wherein when the bumper is impacted, the cable deflects such that tension in the cable increases, causing the torsion springs to expand.

18. The method of claim 17, wherein bumper further includes the energy absorbing material and the cable is disposed between the energy absorbing material and the fascia material, and wherein the energy absorbing material causes the cable to rebound from the deflected position, causing the torsion springs to compress and return the cable to the sensing position.

19. The method of claim 12, wherein each tension sensor is a load cell.

\* \* \* \* \*